April 9, 1946.   L. BIRKIGT   2,397,941
SUPERCHARGED INTERNAL-COMBUSTION ENGINE
Filed Sept. 22, 1942
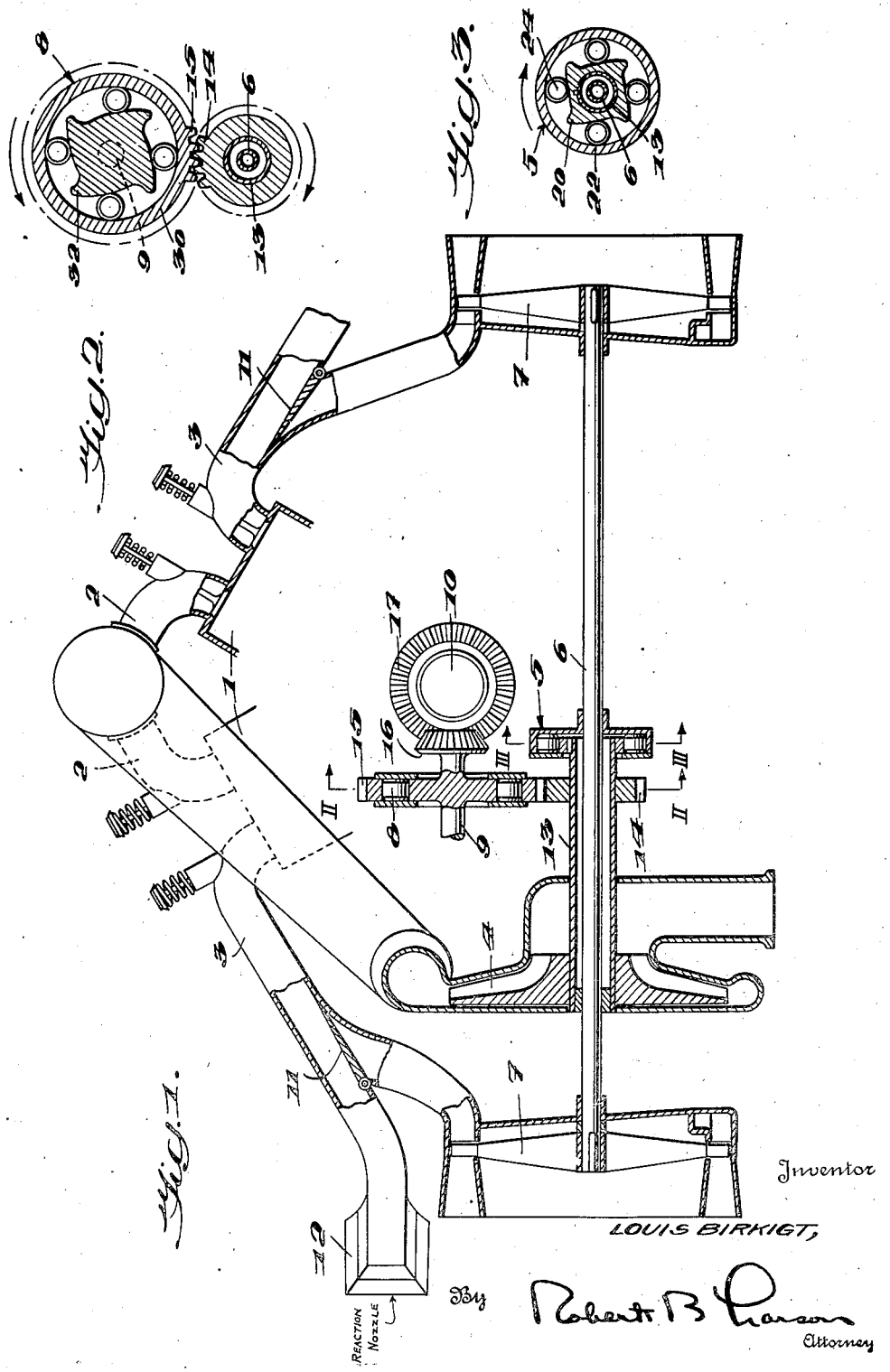

Patented Apr. 9, 1946

2,397,941

UNITED STATES PATENT OFFICE 2,397,941

SUPERCHARGED INTERNAL-COMBUSTION ENGINE

Louis Birkigt, Versoix, Geneva, Switzerland

Application September 22, 1942, Serial No. 459,322
In France May 22, 1942

5 Claims. (Cl. 60—13)

This invention relates to supercharged internal combustion engines wherein pure or carburetted air is fed under pressure to the engine cylinders and refers more particularly to aircraft engines intended to operate at variable heights above sea level.

The invention primarily consists in providing such engines with a supercharger connected through a unidirectional or free-wheel gear to a gas turbine which may be operated by the exhaust gases from the engine cylinders, and also through another unidirectional or free-wheel gear to a driving shaft driven by the engine itself, the arrangement being such that the supercharger may be driven by the engine when the turbine is idle and may also be driven by the turbine itself at a speed higher than the speed corresponding to the engine drive.

In the annexed drawing:

Fig. 1 diagrammatically shows, with parts in section, an aircraft engine provided with a supercharger in accordance with this invention.

Figs. 2 and 3 are sectional views taken through lines II—II and III—III of Fig. 1.

The engine illustrated in Fig. 1 is of the V-cylinder type, the cylinders being indicated at 1 with their inlet pipes 2 and exhaust pipes 3. The supercharger is formed of a centrifugal compressor 4 carried at one end of a tubular shaft 13 provided at its other end with a unidirectional gear or free-wheel device indicated generally by the reference numeral 5 in Fig. 1.

As shown in Fig. 3, free-wheel 5 comprises an inner member 20 provided with wedge-shaped teeth, an outer member 22 co-axial with the inner member, and rollers 24 co-acting with both members to connect the same for one direction of the torque transmitted. The inner member 20 is keyed on shaft 13 while the outer member 22 is keyed on a spindle 6 on which shaft 13 is rotatably mounted, as shown in Fig. 1, the said spindle being supported by suitable bearings not illustrated.

Spindle 6 extends transversely with respect to the engine shaft 10, preferably below same and at the rear of the engine, and is provided at its ends with two exhaust gas turbines 7.

The exhaust pipes 3 are provided with movable vanes 11 forming a sort of three-way cock and adapted to permit of directing the exhaust gases either to turbines 7 or to exhaust nozzles 12, only one of which is shown.

Shaft 13 also carries a toothed pinion 14 (Figs. 1 and 2) engaged by a gear wheel 15 carried by the outer member 30 of a free-wheel device 8, substantially similar to free-wheel 5. The inner member 32 of the free-wheel 8 is carried by a shaft 9 driven by engine shaft 10 through a multiplying gearing which, in the example illustrated, is formed of a pair of bevel gears, 16 and 17.

The operation is as follows:

At low and average altitudes and under cruising conditions vanes 11 are so disposed that the exhaust gases are directed towards nozzles 12 from which they issue into the atmosphere and help by reaction effect the propelling of the aircraft. The exhaust gas turbines are idle, but shaft 13 is driven by the engine shaft 10 through free-wheel 8, while free-wheel 5 is inactive, spindle 6 being at standstill. The ratio between the engine speed and the supercharger speed is preferably such that the pressure ratio is low, which is the most favourable condition at low heights.

When the aircraft height increases, vanes 11 are progressively closed and the exhaust gas turbines are thus operated. When they reach a speed equal to the speed of shaft 13 and the free-wheel 5 becomes active and connects shafts 6 and 13 with each other, whereby the power delivered by turbines 7 helps the engine to drive the supercharger 4. This power is therefore saved on the engine shaft proper.

When the power from turbines 7 exceeds the power required to drive the supercharger at the speed corresponding to the engine drive, free-wheel 8 becomes in turn inactive and the supercharger is exclusively driven by the exhaust gas turbines. The engine operates as a supercharged engine provided with a turbo-compressor set, since the mechanical connection between shafts 10 and 13 is then suppressed.

Since the turbines only operate at high altitudes, it is not so important that forced cooling means be provided as in some of the known constructions. In some cases the forced cooling may even be dispensed with. In the event the turbine should stop, which occurs sometimes under certain conditions of altitudes and speed, the engine is still supercharged, as the supercharger is then driven directly by the engine shaft and will continue to do so until the turbines resume their normal operation.

It will be understood that the above description only shows an embodiment of my invention, the details of which may vary within the ambit of the appended claims.

I claim:

1. In a supercharged internal combustion engine an engine shaft; a supercharger adapted to feed said engine under pressure; an exhaust gas turbine actuated by exhaust gases from said engine; a mechanical connection embodying a unidirectional device, interposed between said engine shaft and said supercharger to permit transmission of power from said engine shaft to said supercharger; and another mechanical device also embodying a unidirectional device, interposed between said exhaust gas turbine and said supercharger to permit transmission of power from said turbine to said supercharger, said exhaust gas turbine being carried by a rotatable spindle and said supercharger being carried by a hollow shaft rotatably supported by said spindle.

2. In a supercharged engine as claimed in claim 1, means to direct the exhaust gases either directly to the atmosphere, or to the exhaust gas turbine, or to both at the same time.

3. In a supercharged internal combustion engine an engine shaft; a supercharger adapted to feed said engine under pressure; a rotatable tubular shaft to carry said supercharger; a rotatable spindle extending through said tubular shaft, said shaft and said spindle being loose with respect to each other; an exhaust gas turbine carried by each end of said spindle; a unidirectional device to connect said spindle to said tubular shaft to permit transmission of power from said exhaust gas turbines to said supercharger; a mechanical connection between said engine shaft and said tubular shaft; and a unidirectional device interposed in said connection to permit transmission of power from said engine to said supercharger.

4. In an engine as claimed in claim 3, means to direct the exhaust gases either directly to the atmosphere, or to the exhaust gas turbines, or to both at the same time.

5. In a supercharged internal combustion engine an engine shaft; a supercharger adapted to feed said engine under pressure; an exhaust gas turbine actuated by exhaust gases from said engine; a mechanical connection embodying a unidirectional device, interposed between said engine shaft and said supercharger to permit transmission of power from said engine shaft to said supercharger; another mechanical device also embodying a unidirectional device, interposed between said exhaust gas turbine and said supercharger to permit transmission of power from said turbine to said supercharger; an exhaust pipe provided between said engine and said exhaust gas turbine; a reaction nozzle branched on said exhaust pipe; and a vane adapted to direct the exhaust gases to said reaction nozzle or to said exhaust gas turbine or to both at the same time.

LOUIS BIRKIGT.